(12) United States Patent
Chu et al.

(10) Patent No.: US 8,726,210 B2
(45) Date of Patent: May 13, 2014

(54) OPTIMIZING TIMING CRITICAL PATHS BY MODULATING SYSTEMIC PROCESS VARIATION

(75) Inventors: Albert M. Chu, Essex, VT (US); Manikandan Viswanath, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/416,015

(22) Filed: Mar. 9, 2012

(65) Prior Publication Data
US 2013/0239078 A1 Sep. 12, 2013

(51) Int. Cl.
G06F 17/50 (2006.01)

(52) U.S. Cl.
USPC ........... 716/115; 716/108; 716/113; 716/134; 716/105; 716/139; 703/13; 703/14

(58) Field of Classification Search
USPC ................ 716/108, 113, 115, 118–119, 122, 716/132–135, 139; 703/13–14
See application file for complete search history.

(56) References Cited

U.S. PATENT DOCUMENTS

| | | | |
|---|---|---|---|
| 6,427,226 B1 | 7/2002 | Mallick et al. | |
| 6,904,572 B2 | 6/2005 | Igarashi | |
| 7,203,918 B2 | 4/2007 | Wei et al. | |
| 7,441,211 B1 | 10/2008 | Gupta et al. | |
| 7,716,618 B2 | 5/2010 | Ferrari et al. | |
| 7,849,433 B2 * | 12/2010 | Chadwick et al. | 716/102 |
| 7,890,906 B2 * | 2/2011 | Chadwick et al. | 716/123 |
| 7,895,550 B2 * | 2/2011 | Walker et al. | 716/100 |
| 7,921,402 B2 | 4/2011 | He | |
| 7,962,117 B2 | 6/2011 | Elder et al. | |
| 8,069,430 B2 * | 11/2011 | Moroz et al. | 716/122 |
| 8,301,290 B2 * | 10/2012 | Culp et al. | 700/121 |
| 2007/0099313 A1 | 5/2007 | Hanson et al. | |
| 2008/0066025 A1 * | 3/2008 | Tanaka | 716/4 |
| 2009/0210834 A1 | 8/2009 | Chadwick et al. | |
| 2010/0306723 A1 | 12/2010 | Abbaspour et al. | |
| 2011/0107291 A1 * | 5/2011 | Barwin et al. | 716/134 |
| 2011/0133252 A1 | 6/2011 | Hosomi | |

FOREIGN PATENT DOCUMENTS

JP 2005294355 A 10/2005

OTHER PUBLICATIONS

K. Yelamarthi et al., "Process Variation Aware Transistor Sizing for Load Balance of Multiple Paths in Dynamic CMOS for Timing Optimization", Journal of Computers, Feb. 2008, pp. 21-28, vol. 3, No. 2.

\* cited by examiner

*Primary Examiner* — Nghia Doan
(74) *Attorney, Agent, or Firm* — David Cain; Roberts Mlotkowski Safran & Cole, P.C.

(57) ABSTRACT

Systems and methods are provided to optimize critical paths by modulating systemic process variations, such as regional timing variations in IC designs. A method includes determining a physical location of an element in the semiconductor chip design within the critical path. The method further includes modulating a systemic process variation of the semiconductor chip design to speed up the critical path based on a polysilicon conductor perimeter density associated with the element.

22 Claims, 5 Drawing Sheets

| | 305 | 310 | 315 | 320 |
|---|---|---|---|---|
| 300 | Zone | Pden | Relative Channel Length Comp Desired | Add Filler Elements? |
| | 201 | ≤3.0 | - 8% | Yes |
| | 202 | >3.0-5.0 | - 6% | Yes |
| | 203 | >5.0-7.0 | - 4% | Yes |
| | 204 | >7.0-9.0 | - 2% | Yes |
| High Pden | 205 | >9.0 | None | Optional |

FIG. 3

OPTIMIZING TIMING CRITICAL PATHS BY MODULATING SYSTEMIC PROCESS VARIATION

FIELD OF THE INVENTION

The invention relates to integrated circuits and, more particularly, systems and methods for optimizing critical paths by modulating systemic process variations, such as regional timing variations in IC designs.

BACKGROUND

The locations of transistors within integrated circuits tend to be unevenly distributed in semiconductor chips. For instance, the transistors may be more densely packed in the center of a semiconductor chip than at the edges. Polysilicon Conductor (PC) perimeter density (i.e., edge density) provides a measure of this density. More specifically, PC perimeter density is determined by measuring the PC perimeter lengths within a unit area of semiconductor chip.

The performance of field effect transistors (FETS) in integrated circuits (IC) varies in relation to the PC perimeter density. FETS placed in high PC perimeter density regions (i.e., high PDen regions) tend to operate faster than cells in low density regions (e.g., low PDen). When the PC perimeter density in a given region is high, FETS in that region generally have relatively low threshold voltages and relatively short effective channel lengths and, consequently, have relatively short delay times. On the other hand, when the PC perimeter density in a given region is low, FETS in that region generally have relatively high threshold voltages and relatively long effective channel lengths, and, thus, relatively long delay times. Accordingly, the FETS included in a cell (e.g., a NAND gate) within a high PC perimeter density area may operate faster than another instance of the cell in a lower PC perimeter density area. These systemic process variations produce timing offsets between signals traveling through different density regions.

One technique for avoiding such systemic process variations involves making the PC perimeter densities across an IC uniform across so timing offsets between synchronous circuits are minimized. However, by making the PC perimeter density uniform, the timing constraints of particular circuits may be narrowed and/or exceeded. For instance, decreasing the PC perimeter density in region may reduce timing slack in for a signal path that traverses the region. In addition, increasing the PC perimeter density may increase the speed of a signal path such that a race condition is created.

Accordingly, there exists a need in the art to overcome the deficiencies and limitations described hereinabove.

SUMMARY

In an aspect of the invention, there is a computer-implemented method for improving the performance of a critical path of a semiconductor chip design. The method includes determining a physical location of an element in the semiconductor chip design within the critical path. The method further includes modulating a systemic process variation of the semiconductor chip design to speed up the critical path based on a polysilicon conductor perimeter density associated with the element based on the determined physical location of the element.

In another aspect of the invention, a computer-implemented method for improving performance of a semiconductor chip design includes determining a critical path in the semiconductor chip design. The method further includes associating an element with one of a plurality of predetermined PC perimeter density groups based on a PC perimeter density of a region of the semiconductor chip design that includes the element. The method further includes determining that the element is located in the critical path. The method further includes selectively compensating the PC perimeter density of the region that includes the element to speed up the critical path based on the PC perimeter density group associated with the element.

In another aspect of the invention a computer program product includes a tangible computer-usable storage medium having a computer readable program stored in the medium, wherein the computer readable program, when executed on a computing device, is operable to cause the computing device to determine a critical path in an integrated circuit design. Further, the computer readable program is operable to determine physical locations of elements of the integrated circuit design. Further, the computer readable program is operable to selectively compensate PC perimeter densities in regions of the integrated circuit based on respective PC perimeter densities associated with the elements.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 3 shows an exemplary data structure including polysilicon perimeter density ranges and corresponding compensation values in accordance with aspects of the invention;

DETAILED DESCRIPTION

Figure 1:
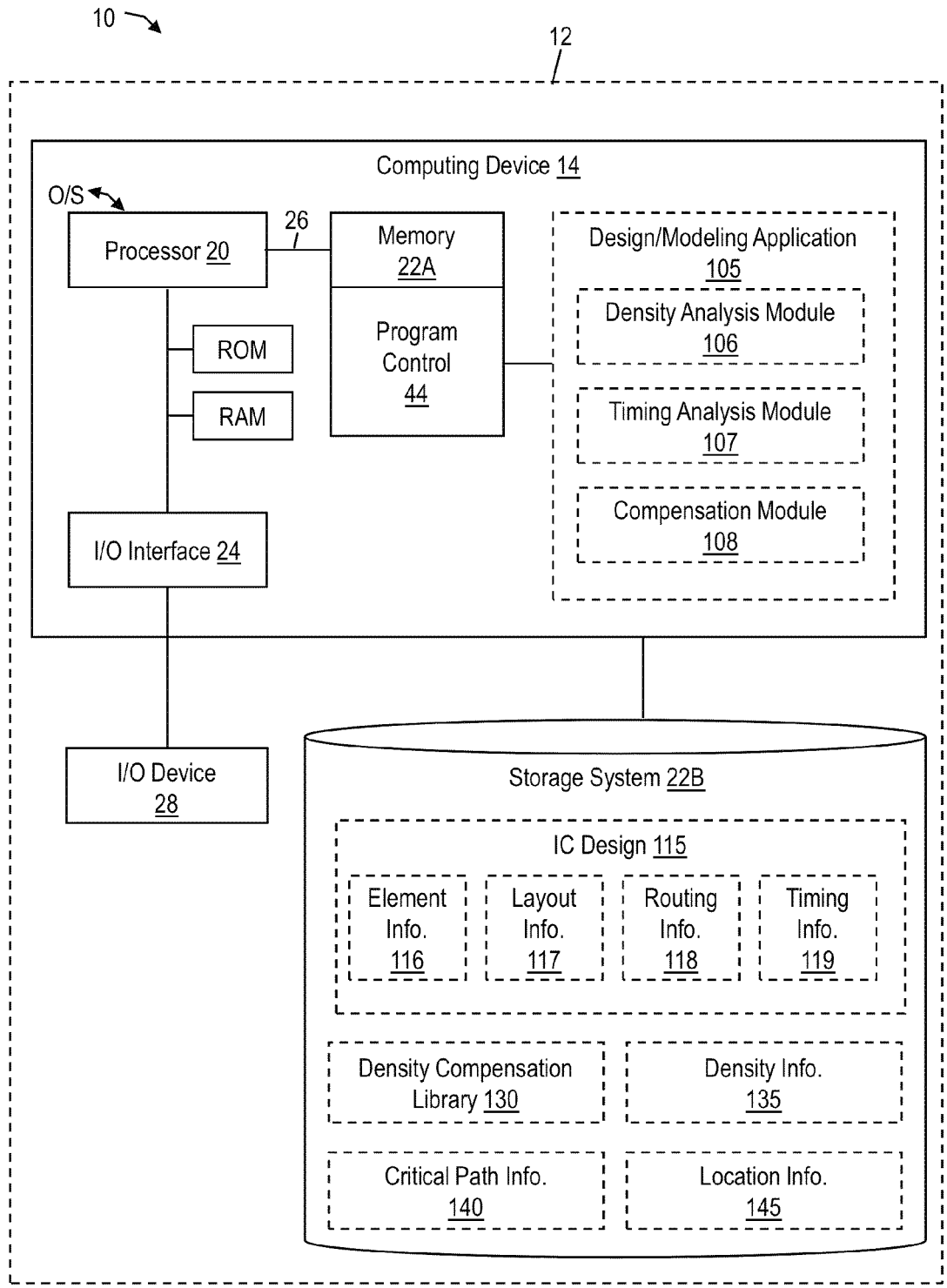
FIG. 1 shows an illustrative environment for implementing designs and steps in accordance with aspects of the invention.

The invention relates to optimizing critical timing path circuits (i.e., critical paths) by modulating systemic process variations, and, more particularly, to optimizing critical paths by modulating regional timing variations in semiconductor chip designs. Aspects of the invention modulate the systemic process variation of semiconductor chip designs by selectively compensating the PC perimeter densities along the critical paths. Thus, embodiments of the invention leverage the systemic process variation of semiconductor chip designs to optimize IC timing, as opposed to performing density compensation independent of timing.

In embodiments, a method determines one or more critical paths in an IC and determines whether the critical paths fall in high PC perimeter density regions. The PC perimeter density within regions of the semiconductor chip may be compensated by selectively changing the poly channel length of the FETs that comprise the elements (e.g., cells) of the critical paths. Additionally or alternatively, the PC perimeter density within regions of the IC may be compensated by adding filler elements (e.g., dummy gate arrays) in the area of elements to increase the PC perimeter density along the critical path. Further, according to aspects of the invention, the method recreates timing rules and re-times the IC after optimizing the PC perimeter density of an IC. Recreating the timing rules includes performing a timing analysis on each critical path affected by a density change. Based on the timing analysis, it is determined whether timing constraints are satisfied and, if not, the PC perimeter density compensation determined for the corresponding critical path may be discarded. In this manner, implementations of the invention take timing into account when performing density compensation to improve the performance and reliability of semiconductor chip designs.

System Environment

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable mediums having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is an exemplary environment 10 for implementing the steps in accordance with aspects of the invention. To this extent, the environment 10 includes a server or other computing infrastructure 12 that can perform the processes described herein. In particular, the computer infrastructure 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with an external I/O device 28 and a storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a design/modeling application 105 that performs one or more of the processes described herein. The design/modeling application 105 can be implemented as one or more sets of program code in the program control 44 stored in memory 22A as separate or combined modules. Additionally, the design/modeling application 105 may be implemented as separate dedicated processors or a single or several processors to provide the function of these tools.

According to aspects of the invention, the design/modeling application 105 includes a density analysis module 106, timing analysis module 107, and compensation module 108, the functions of which are discussed in greater detail herein. As shown, modules 106-108 are separate modules within the design/modeling application 105. In embodiments, the functionality of one or more of the modules 106-108 may instead be integrated within the design/modeling application 105. Alternatively or additionally, one or more of the modules 106-108 may be provided as a separate application from the design/modeling application 105.

While executing the computer program code, the processor 20 can read and/or write data to/from the memory 22A, the storage system 22B, and/or the I/O interface 24. The program code executes the processes of the invention, for example, a design/modeling application 105. Further, the program code can read and/or write data to/from an IC design 115 from the memory 22A, the storage system 22B, and/or the I/O interface 24. The IC design 115 may include, for example, element information 116, layout information 117, routing information 118, timing information 119, density compensation library 130, density information 135, critical path information 140, and location information 145, as well as other data. The bus 26 provides a communication link between each of the components in the device 14.

In accordance with aspects of the invention, the design/modeling application 105 is computer program code stored in, for example, memory 22A and/or storage system 22B that, when executed by the processor 20, causes the computing device 14 to optimize critical paths of IC designs (e.g., IC design 115) by modulating the systemic process variation. In embodiments, the design/modeling application 105 determines the PC perimeter density of unit regions an IC, determines critical paths, and selectively compensates (e.g., increases) the PC perimeter density of elements (e.g., standard cells comprised of transistors that function as Boolean logic, flip-flops, latches, adders, multiplexers, etc.) and/or regions along the critical paths to optimize the IC's timing. Further, in embodiments, the design/modeling application 105 analyzes the timing of IC designs after compensating the PC perimeter densities, determines whether any timing constraints are violated by the changes, and discards changes that violate the timing constraints.

The design/modeling application 105 may include one or more software or hardware modules for designing, modeling, analyzing and verifying IC designs. For instance, the design/modeling application 105 may be a synthesis/placement electronic computer-aided design (ECAD) application and/or electronic design automation (EDA) tool that reads in one or more of design element definitions (e.g., Very-High-Speed Integrated Circuit Hardware Description Language (VHDL) definitions for standard cells), physical area constraints, timing constraints, power constraints, design library information, synthesis rules, and operating conditions, among other information.

According to aspects of the invention, the design/modeling application 105 may determine one or more critical paths in an IC design and determine whether the critical paths fall in high PC perimeter density regions (i.e., "Pden regions"). In embodiments, based on the determined PC perimeter density of the regions along the critical paths, the design/modeling application 105 compensates the density of FETS within the regions of the IC by changing their poly channel lengths and/or adding filler in regions along the critical path. Additionally, the design/modeling application 105 may recreate timing rules and re-time the IC by analyzing the timing of each critical path affected by a density change (e.g., using static timing analysis). Based on the timing analysis, it is determined whether timing constraints are violated and, if so, the determined density changes are discarded (i.e., not implemented in the IC design).

In embodiments, the density analysis module 106 is computer program code stored in, for example, memory 22A and/or storage system 22B that, when executed by the processor 20, causes the computing device 14 to determine the PC perimeter densities in regions of IC designs. The density analysis module 106 can generate a map identifying multiple density zones of the IC, including different ranges of PC perimeter density. Thus, the density map indicates zonal variations in PC perimeter density, which may correspond to systemic process variations in FET timing.

In accordance with aspects of the invention, the timing analysis module 107 is computer program code stored in, for example, memory 22A and/or storage system 22B that, when executed by the processor 20, causes the computing device 14 to perform a timing analyses of IC designs. In embodiments, the timing analysis module 107 is a simulation tool (e.g., SPICE) that analyzes and models the operation of an IC design to predict the designs' operation. In other embodiments, timing analysis module 107 can comprise static timing analysis tool that verifies circuit logic and timing without requiring a full simulation of an IC design.

For each signal in the IC design, the timing analysis module 107 may determine the arrival time, the required time, the slack, and the critical paths. The arrival time of a signal is the time elapsed for a signal to arrive at a certain point based on the delay cause all the elements along the path of the signal. Arrival times may be represented by pair of values, including, the earliest possible time at which a signal can arrive at the point (e.g., a node), and the latest. The required time is the latest time at which a signal can arrive without increasing the IC's clock cycle. The slack is the difference between the required time and the arrival time. A positive slack indicates that the arrival time at that point may be increased without affecting the overall delay of the circuit. Conversely, negative slack indicates that a path is too slow, and the path must be sped up if the IC is to operate at the desired speed. The critical paths are the signal paths between transmitter and receiver elements in the IC having the greatest delay such that the paths have the least slack. The timing analysis module 107 may determine critical paths in IC design 115 and store information describing the critical path in storage system 22B as, e.g., critical path information 140.

In accordance with aspects of the invention, the compensation module 108 is computer program code stored in, for example, memory 22A and/or storage system 22B that, when executed by the processor 20, causes the computing device 14 to determine changes in the PC density in zones of IC designs by changing the poly channel length of the FETs (i.e., channel length compensation) and/or by using filler elements (i.e., fill compensation) to change the polysilicon density.

Poly channel length compensation modifies the corresponding model of elements (e.g., cells) in the element information to include FETs having different channel lengths. For example, the poly channel length can be compensated by adjusting a graphic representations of elements in in semiconductor chip design data (i.e., "GDS") by modifying the edge of polygons representing the elements. In embodiments, the amount of compensation to apply to elements in each PDen region is pre-determined empirically via experimentation. Adjusting a FET model to make its channel length longer tends to slow down the device. Conversely, adjusting a FET model to make its channel length shorter tends to speed up the device. Thus, the PC perimeter density of an IC design can be selectively compensated by changing the channel lengths of elements in regions of a semiconductor chip. In this manner, the systemic process variation of the semiconductor chip can be modulated to speed-up the critical paths.

Fill compensation includes adding additional, non-functional elements (e.g., filler cells or dummy cells) to inactive spaces in the regions around functional IC elements to increase PC perimeter density around the function elements. The filler cells may be predetermined elements stored, for example, as element information 116, or the filler cells may be automatically generated to fit within the available space. The filler cells may have various shapes, such as any polygon, an E shape, a C shape, a concentric pattern, parallel and perpendicular gate portions, and parallel gates. The inactive gates form the fill shapes and may be perpendicular to an inactive portion of the substrate, overlap with the substrate, extend past the substrate or be completely within the substrate forming the inactive region of the device. By adjusting the shape of the filler shapes gate structure, it is possible to modulate the PC perimeter density in a particular area.

The design/modeling application 105 may model, analyze, and/or verify an IC based on device design information, such as IC design 115, stored in storage system 22B (and/or memory 22A). In embodiments, the IC design 115 includes, element information 116 (e.g., standard cell models), layout information 117 (e.g., IC area, physical cell locations), routing information 118 (e.g., netlists), and timing information 119.

The element information 116 defines the physical structure of elements that may be included in the IC design 115. The elements may include standard cells, which are groups of transistors and interconnects that provide a particular function (e.g., Boolean logic). For each element that may be included in an IC design, the element information may include a netlist (i.e., a description of transistors, of their connections to each other, and of their external connections (e.g., terminals)). The element information 116 may also include a description of the physical layout of the elements (e.g., a manufacturing blueprint). Further, the element information 116 may include operational parameters of each element that model the power, timing constraints (e.g., arrival times, required times, slack), and noise characteristics of the elements (e.g., based on simulation data and/or static timing analysis).

In embodiments, the element information 116 is a library of elements that define multiple versions of standard cells that perform the same function but have different element information (e.g., netlists, physical layouts, and/or characteristics). In embodiments, different versions of a standard cell may have different poly channel lengths that may be selected to optimize the timing of critical paths in the IC design 115. Furthermore, the element information may include filler elements that may be selectively added to IC designs to compensate density in a region and, thereby optimizing the timing of critical paths in the IC design 115. Filler elements are standard cells, such as gate arrays, having a variety of different shapes.

The layout information 117 defines locations of elements in IC designs. In embodiments, the layout information 117 may be determined by the design/modeling application 105 based on, for example, information included in the IC design 115, including a floor plan, element information (e.g., netlists), placement rules, and libraries.

The routing information 118 defines signal paths (e.g., wires) connecting elements of the IC design 115. In embodiments, the routing information may be determined by the design/modeling application 105 based on the element information 116 (e.g., netlists) and layout information 117 (e.g., physical locations).

The timing information 119 identifies timing constraints of IC designs. As noted above, the timing information may be obtained from circuit simulations or static timing analyses. In embodiments, in the IC design 115, the timing information 119 may include an arrival time, a required time and a slack for each signal traveling from a transmitter to a receiver.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
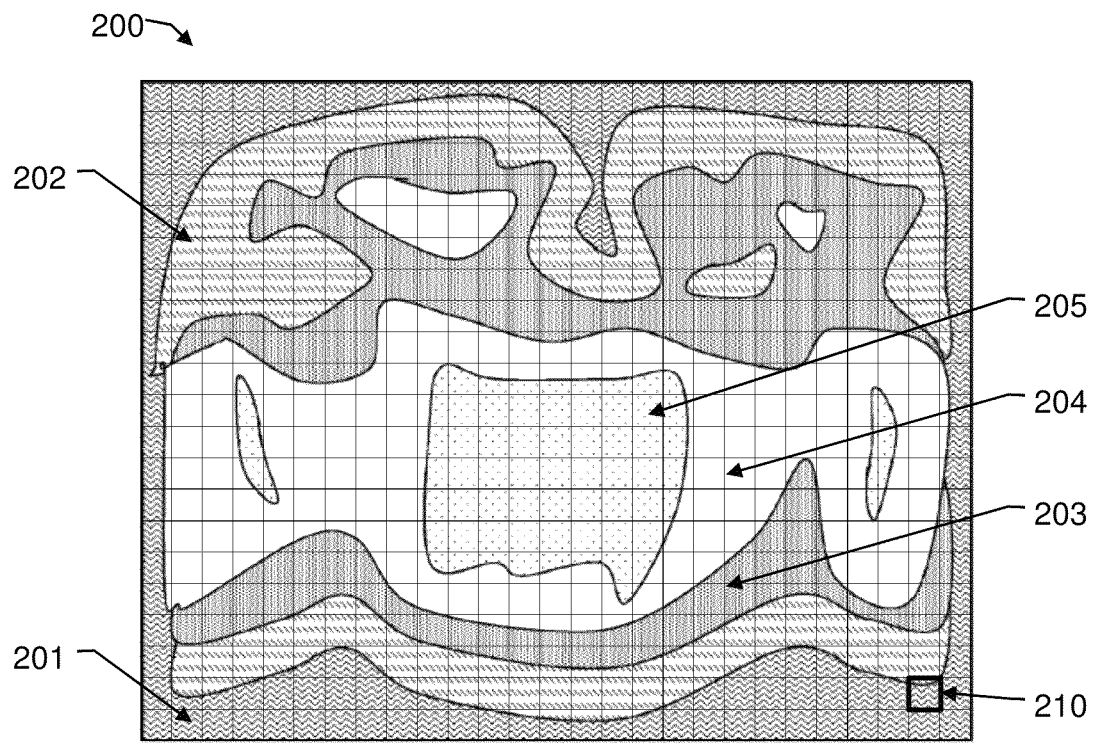
FIG. 2 is an illustration of an exemplary density map of a semiconductor chip showing regional variations in polysilicon perimeter density in accordance with aspects of the invention.

As discussed above, the density of an IC may vary such that FETs located in high-density zones may operate faster than FETs located in low-density zones. FIG. 2 illustrates an exemplary PC perimeter density map 200 of an IC design having density zones 201-205, wherein each zone is comprised of regions within different predefined PC perimeter density ranges. The density map 200 can be generated, for example, by the computing device 14 (e.g., using density analysis module 106) based on the IC design 115, including the physical layout of elements in the design (e.g., element information 116 and layout information 117).

In embodiments, the density map 200 is determined by identifying the polysilicon layers of elements within areas (e.g., unit areas) of the IC design, and dividing the total (e.g., cumulative) PC perimeter length of all the elements in the by the area. In density map 200, zone 201 (at the edges of the map) includes areas having the lowest polysilicon perimeter density range, and zone 205 (in the center of the map 200) includes areas having the highest polysilicon perimeter density range. Zones 202, 203, and 204 have progressively higher PC perimeter density ranges between zone 201 and zone 205. While the exemplary density map 200 includes five density zones corresponding to five different ranges of PC perimeter density, embodiments may comprise greater or fewer number of zones corresponding to more or less granular ranges of PC perimeter density. Moreover, the exemplary density map 200 shows an IC that is generally denser in the center of the map. Other examples, however, may have higher densities at one or more edges of the IC.

As shown in FIG. 2, the entire density map 200 is divided into a number of regions 210. In FIG. 2, the regions 210 are substantially square in shape and equal in area. The location of each region may be identified based on a reference point (e.g., a Cartesian coordinate system). In other embodiments, different shapes and areas may be used. The shape of regions 210 may be, for example, any polygon. The shapes and/or areas of regions 210 may be automatically generated by design/modeling application 105 or may be designated by a design engineer to provide different granular divisions of the regions and different regions 210 may have different areas.

FIG. 3 shows an exemplary data structure (e.g., table 300) providing a density compensation library (e.g., density compensation library 130) associating the zones 201-205 with corresponding PC perimeter density (Pden) ranges and compensation information. Column 305 provides an identifier corresponding to zones of different PC perimeter density (i.e., PDen) ranges. As shown, the density compensation library includes five rows identifying the five zones 201-205 of PC perimeter density illustrated in FIG. 2 and listed in column 310. Thus, each density region (e.g., region 210) of a density map may be associated with one of several different zones (e.g., zones 201-205) based on the regions' respective PC perimeter density.

Column 315 illustrates polysilicon channel length compensation values corresponding to the respective zones 201-205 in column 305 and PC perimeter density ranges in column 310. Column 315 provides a percentage adjustment for the channel length compensation. It should be understood that values other than percentages may be used. For example, column 315 may provide a total FET channel length compensation value (e.g., in nanometers) desired for each zone in column 305. Column 320 provides a corresponding value indicating whether fill compensation is to be performed. The compensation values in the table 300 (e.g., the density compensation library 130) may be predetermined values defined by a design engineer based on, for example, experimentation, modeling, simulation, and/or empirical knowledge.

As should be understood, the values and divisions shown in FIG. 3 are provided for illustration and other values and divisions may be used. In exemplary embodiments, as shown in FIG. 3, zone 205 in column 305 may be considered to have a high PC perimeter density. That is, any region having a PC perimeter density greater than 9.0 may be considered high density zone and thus receive weak, if any, density compensation. On the other hand, any region having a PC perimeter less than or equal to 9.0 may be considered a low density zone and thus receive a degree of density compensation to speed up the critical path of the semiconductor chip design.

According to aspects of the invention, the systemic process variation modulation may be determined (e.g., by compensation module 108) with reference to the values stored in the density compensation library. In FIG. 3, table 300 includes exemplary values, wherein zone 201 includes regions having a PC perimeter density value less than 3.0, which is the lowest PC perimeter density. Accordingly, table 300 indicates a FET channel length compensation of −8%, which is the highest. In addition, table 300 indicates fill compensation to further increase the PC perimeter density of regions in zone 201. On the other hand, zone 205 includes regions having a PC perimeter density greater than 9.0, which is the highest density regions on the IC chip. Accordingly, no FET channel length compensation is indicated in table 300 and fill compensation is optional.

Flow Diagrams

Figure 4A:
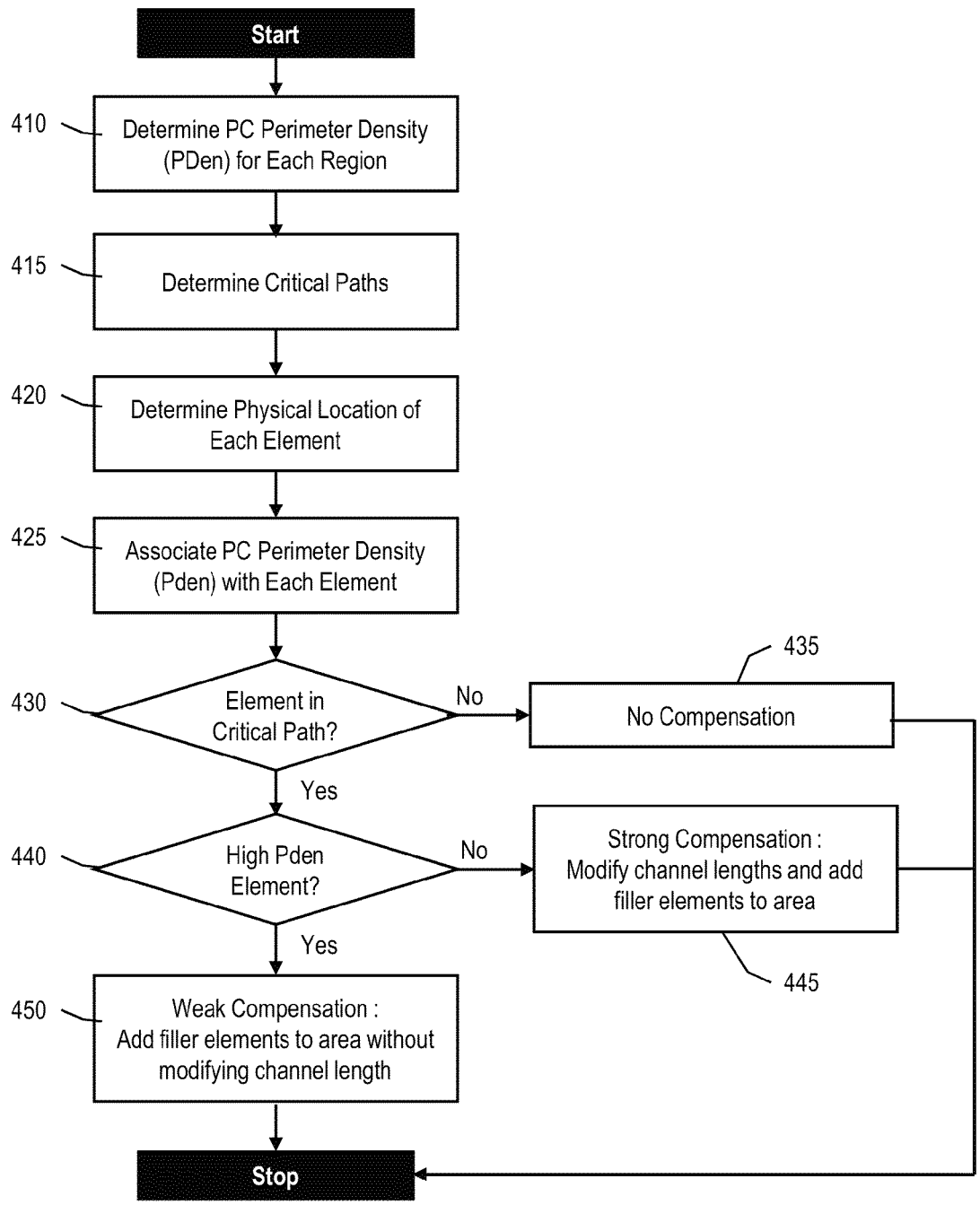
FIG. 4A shows a flow diagram of an exemplary process usable to optimize timing critical paths in an semiconductor chip design by modulating systemic process variation in accordance with aspects of the invention.
Figure 4B:
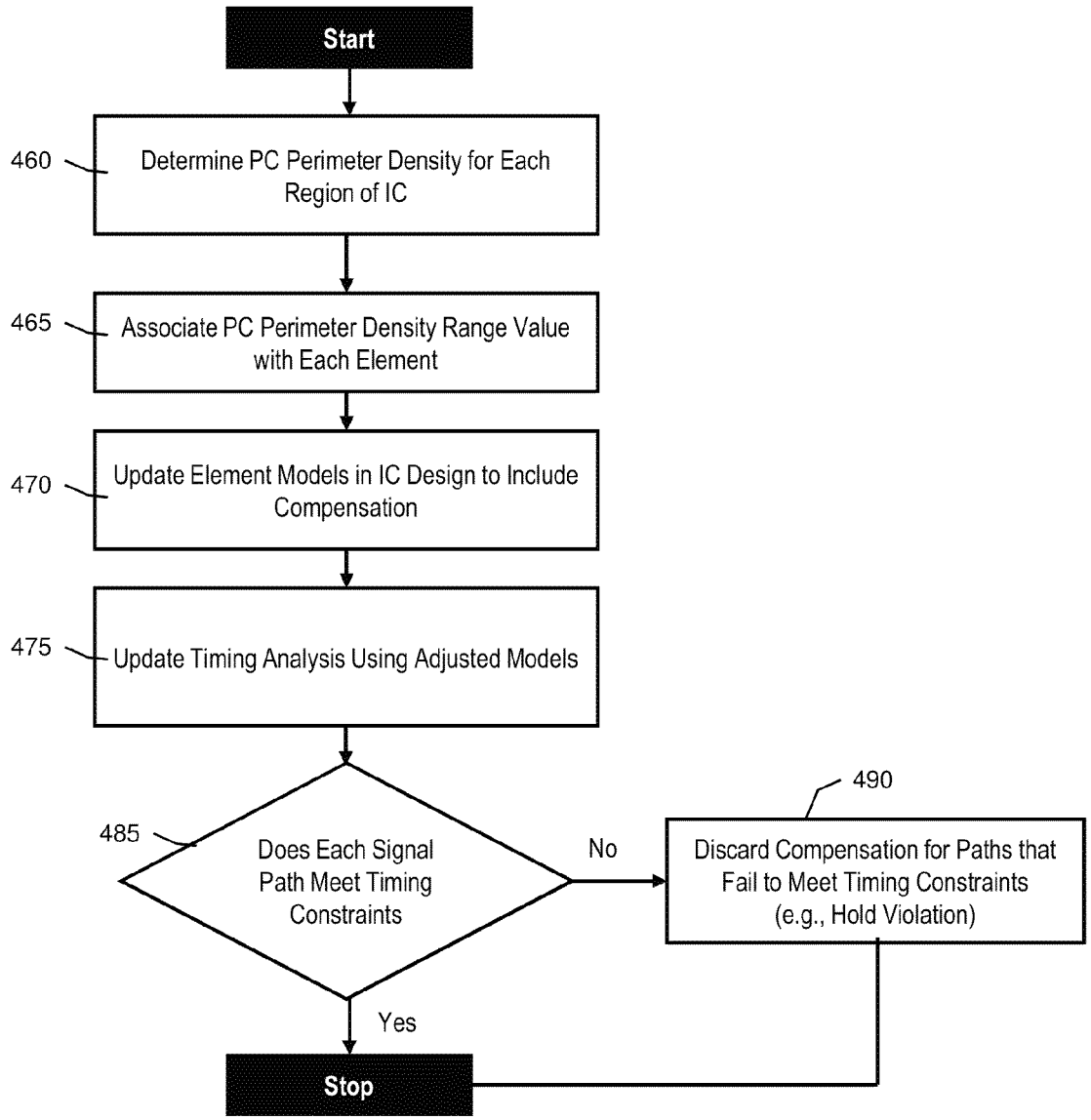
FIG. 4B shows a flow diagram of an exemplary process usable to re-time an IC after optimizing timing critical paths in accordance with aspects of the invention.

FIGS. 4A and 4B show exemplary flows for performing aspects of the present invention. The steps of FIGS. 4A and 4B may be implemented in the environment of FIG. 1 and using information identified in FIGS. 2 and 3, for example.

The flowcharts in FIGS. 4A and 4B illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environments of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disc-read/write (CD-R/W) and DVD.

FIG. 4A shows a flow diagram of an exemplary process usable to optimize timing of critical paths in an IC by modulating the systemic process variation. According to aspects of the invention, the methods may be used to selectively compensate the PC perimeter density in areas a semiconductor chip design by adjusting the channel lengths of cells and/or by adding filler elements.

At the start of the process, a semiconductor chip design (e.g., IC design 115) may be substantially complete and ready for verification and/or fabrication. That is, elements of the IC have been placed, signal lines have been routed, clock trees have been laid out, the timing analyzed. As such, the physical locations of elements, signal lines and clock nets, as well as the critical paths are known and/or can be determined. For example, as shown in FIG. 1, the IC design 115 may be stored in storage system 22B and include element information 116, layout information 117, routing information 118, and timing information 119.

At step 410, a computing device (e.g., computing device 14 using design/modeling application 105 and density analysis module 106) determines PC perimeter densities for the semiconductor chip. In embodiments, the computing device determines the PC perimeter densities by dividing the body of the IC chip into a number unit areas (e.g., regions 210) mapped across the surface of the semiconductor chip. For each unit area, a PC perimeter density is determined and a corresponding density value is stored for reference (e.g., in storage system 22B as density information 135). In embodiments, the density value identifies the area with a predetermined range (e.g., group) of density values.

For example, as shown in the density map 200 in FIG. 2, the unit areas may be regions 210, which are squares arranged in a grid pattern over the surface of a semiconductor chip. For each region 210, the computing device determines the PC perimeter density. That is, for a region of IC chip, the PC perimeter density is equal to the sum of PC perimeters within the region divided by the area of the region. The determined PC perimeter density for each region may be stored along with its location in the semiconductor chip design for reference (e.g., as density information 135 in storage system 22B). Further, the determined PC perimeter density for the region may be associated with a group that includes a range of PC perimeter densities. For instance, zones 201-205 in FIG. 2 include regions with different ranges of PC perimeter density.

At step 415, the computing device determines (e.g., using the timing analysis module 107) critical paths in the device design. The elements in critical paths may be pre-identified in the device design (e.g., as timing information 119) and retrieved from storage (e.g., storage system 22B). For instance, the critical paths may be predetermined based on timing information (e.g. timing information 119) within the device design. Alternatively, the critical paths may be dynamically determined during the process (e.g., by timing analysis module 107).

At step 420, the computing device determines (e.g., using the design/modeling application 105) physical location of elements in the semiconductor chip design. In embodiments, the physical location is a position with respect to a predefined reference point (e.g., a Cartesian or polar coordinate). The determined locations may be stored for reference (e.g., as location information 145 in storage system 22B). For instance, the physical locations may be predetermined based on layout information (e.g., layout information 117) within the device design. Alternatively, the physical locations may be dynamically determined during the process (e.g., by design/modeling application 105).

At step 425, the computing device associates a PC perimeter density with each element (e.g., cell) in the semiconductor chip design based on the PC density information (e.g., density information 135) obtained at step 410, and the element's corresponding physical location (e.g., location information 145) obtained at step 420. In embodiments, the computing device compares the location of each element to the PC perimeter density of the respective region of the elements.

At step 430, the computing device determines whether each element's location is in a critical path based on the critical path information (e.g., critical path information 140) obtained at step 415 and the physical location of the elements (e.g., location information 145) obtained at step 420. When the computing device determines that a particular element is not in any critical path at step 430, then the computing device may determine that no compensation is required at step 435. In alternative embodiments, however, channel length adjustment may be performed on elements not in a critical path to improve the timing of the IC.

When the computing device determines that a particular element is in a critical path at step 430, the computing device then determines (e.g., based on density information 135 determined at step 410, and the element's location information 145 determined at step 420) whether the element is physically located in a high PC perimeter density region at step 440. The determination of whether an element is located in a high PC perimeter density region may be based on the element's PC perimeter density associated at step 425 and predetermined information, such as that in table 300 illustrated in FIG. 3. For instance, the PC perimeter densities listed in column 310 correspond to zone 201-205 in column 305, along with a PC density ranges in column 310. Thus, when an element is associated with one of zones 201-204, it is not in the high PC perimeter density (PDen) region.

When the computing device determines that a particular element is not in a high PC perimeter density region at step 440, then at step 445, the computing device modulates the systemic process variation by performing strong compensation, which includes performing both channel length compensation of the element and fill compensation of in the area of the element elements to increase the perimeter density and, thereby speed up the critical path. For instance, when it is determined that the density range assigned to the element is less than or equal to a threshold value (e.g., a density less than or equal to 9.0, e.g., in zone 201-204 of FIG. 3), the computing device determines that the area is not high PC perimeter density. To speed up the critical path, the computing device (e.g., via compensation module 108) may perform both channel length compensation and fill compensation. In embodiments, the amount of channel length compensation is based on the corresponding PC perimeter density associated with the element at step 425. For example, the PC perimeter density of an area may be placed into one of a number of predetermined ranges (i.e., groups), as described above with respect to FIG. 3.

When the computing device determines that the element is in a high polysilicon density area at step 440, then at step 450 the computing device modulates the systemic process variation by performing weak compensation, which opportunistically improves the PC perimeter density by adding filler elements, when possible, but without performing channel length compensation. For instance, when it is determined that the density range assigned to the element is greater than the threshold value (e.g., a greater than 9.0 in zone 205 of FIG. 3), the computing device determines that the area is not high PC perimeter density, and may further determine whether to add filler elements to improve the PC perimeter density in the area. In some cases, the density of the area may not leave sufficient space to perform fill compensation. When the computing device determines that space is available for one or more filler elements, fill compensation is performed by adding filler elements having shapes that maximize the PC perimeter density in the available space. The filler elements can be selected from a predetermined library (e.g., element information 116) or dynamically generated based on the available space. However, when no space is available for any filler elements, no fill compensation is performed. By doing so, the density in the area of a high PDen element may be increased via filler elements while avoiding overcompensation, which could create a race condition in the IC.

The process described above with respect to FIG. 4A may be used in combination with other PC perimeter density compensation methods. In embodiments, prior to performing channel length compensation (e.g., prior to step 440), fill compensation may be performed for some or all of the elements in the semiconductor chip design. Further, the steps described above with respect to FIG. 4A may be performed in a different order. In embodiments, weak compensation (e.g., step 450) can be performed by adding filler elements in area around elements determined to be in the critical path (i.e., step 430) before determining whether the elements are high PDen elements (i.e., step 440). If the elements in the critical path after performing the weak compensation are not determined to be high PDen elements (i.e., step 440), then additional compensation can be performed (e.g., step 445).

FIG. 4B shows a flow diagram of an exemplary process for re-timing a semiconductor chip design after performing density compensation, as described with respect to FIG. 4A. According to aspects of the invention, the timing of the device design is re-analyzed after performing the density compensation steps illustrated in FIG. 4A and any compensation (e.g., from steps 445 and 450) that violates timing constraints (e.g., creates a race condition and/or hold violation) is discarded. At step 460, the PC perimeter density of the optimized IC is determined, for example, in a manner similar to that described above at step 410. For example, the computing device (e.g., computing device 14 using density analysis module 106) may determine an updated density map (e.g., similar to density map 200) and determine PC perimeter density zones (e.g., zones 201-205) based on the PC perimeters within unit areas (e.g., region 210) of the density map.

At step 465, a PC perimeter density range is associated with each element of the IC design, such as explained in step 425 above. For instance, each element in the IC design may be assigned to one of the five zones 201-205 illustrated in FIGS. 2 and 3 based determined PC perimeter density of the optimized IC and the elements' respective physical location in the IC.

At step 470, the models of elements in the IC design are updated to include the compensation determined by the process of FIG. 4A. For instance, element models in element information 116 of the IC design 115 are updated to include the modified channel lengths and/or the layout information 117 is updated to include the added filler elements.

At step 475, the timing analysis of the IC design is updated using the updated element models. For instance, the timing analysis module 107 may perform a new or updated static timing analysis of the IC design with compensated timing models. The revised timing analysis, therefore accounts for the channel length differences implemented by the channel length compensation and/or the regional increases in PC perimeter densities implemented by the fill compensation.

At step 485, the computing device determines whether each path meets timing constraints of the IC design. For instance, for each path, it is determined whether the static timing analysis passes all setup and hold constraints. When a particular path meets timing constraints, the compensation changes are retained in the IC design. Otherwise, when a particular path fails to meet timing constraints, at step 490, the compensation adjustments (i.e., the compensation determined in steps 445 and 450) for the path are discarded. In some embodiments, all compensation for the elements in the path is discarded. In other embodiments, a percentage (e.g., half) of the compensation for the elements is discarded. In still other embodiments, portions of the compensation for the elements are iteratively discarded and timing analysis re-performed until the path satisfies the timing constraints. The process then ends in the IC design may be finalized and fabricated.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for improving performance of a critical path of a semiconductor chip design comprising:
   determining, by a computing device, physical locations of a plurality of elements within the critical path; and
   speeding up, by the computing device, the critical path by modulating a systemic process variation of the semiconductor chip design based on respective polysilicon conductor (PC) perimeter densities of the plurality of elements within the critical path,
   wherein:
   the critical path is one of a plurality of signal paths in the semiconductor chip design;
   the critical path has the greatest delay among the plurality of signal paths; and
   the modulating the systemic process variation comprises selectively compensating the respective PC perimeter densities of one or more of the plurality of elements that are within the critical path.

2. The method of claim 1, further comprising discarding the modulated systemic process variation of the semiconductor chip design based on determining that the modulated systemic process variation causes the one or more of the plurality of elements to violate a timing constraint of the semiconductor chip design.

3. The method of claim 1, wherein the modulating the systemic process variation comprises selectively compensating the PC perimeter density of the one or more of the plurality of elements at the physical locations based on a predetermined PC perimeter density threshold.

4. The method of claim 3, wherein the selectively compensating the PC perimeter density comprises:
performing channel length compensation and fill compensation when the PC perimeter densities of the one or more of the plurality of elements is less than or equal to the predetermined PC perimeter density threshold; and
performing only fill compensation when the PC perimeter densities of the one or more of the plurality of elements is greater than the predetermined PC perimeter density threshold.

5. The method of claim 1, further comprising associating the PC perimeter density with the element by:
determining PC perimeter densities for regions of the semiconductor chip design that include the physical locations of the the one or more of the plurality of elements; and
associating the determined PC perimeter densities with corresponding groups that each include a range of PC perimeter densities.

6. The method of claim 1, wherein the PC perimeter densities associated with the the one or more of the plurality of elements each correspond to one of a plurality of predetermined PC perimeter density ranges.

7. A computer-implemented method for improving performance of a semiconductor chip design comprising:
determining, by a computing device, a critical path in the semiconductor chip design;
associating, by the computing device, an element with one of a plurality of predetermined polysilicon conductor (PC) perimeter density groups based on a PC perimeter density of a region of the semiconductor chip design that includes the element;
determining, by the computing device, that the element is located in the critical path; and
speeding up, by the computing device, the critical path by selectively compensating the PC perimeter density of the region that includes the element based on the PC perimeter density group associated with the element,
wherein:
the critical path is one of a plurality of signal paths in the semiconductor chip design; and
the critical path has the greatest delay among the plurality of signal paths.

8. The computer-implemented method of claim 7, further comprising:
updating a timing analysis of the semiconductor chip design; and
discarding the compensated PC perimeter density of the region when the updated timing analysis indicates the critical path violates a timing constraint of the semiconductor chip design.

9. The computer-implemented method of claim 7, wherein the selectively compensating the PC perimeter density comprises:
performing a first compensation technique and a second compensation technique when a density range of the PC perimeter density group associated with the element is less than or equal to a threshold; and
performing only the second compensation technique when the density range of the PC perimeter density group associated with the element is greater than the threshold.

10. The computer-implemented method of claim 9, wherein the first compensation technique is channel length compensation and the second compensation technique is fill compensation.

11. The computer-implemented method of claim 10, wherein:
the channel length compensation comprises modifying channel lengths of FETs in the element; and
the fill compensation comprises adding dummy cells to inactive spaces in the region of the semiconductor chip design that includes the element.

12. The computer-implemented method of claim 9, wherein the PC perimeter density group associated with the element is associated with one or more PC perimeter density compensation values.

13. The computer-implemented method of claim 12, wherein the one or more PC perimeter density compensation values include a length compensation value and a fill compensation indicator.

14. A computer program product comprising a tangible computer-usable storage device having a computer readable program stored in the device, wherein the computer readable program, when executed on a computing device, is operable to cause the computing device to:
determine a critical path in an integrated circuit design;
determine physical locations of elements of the integrated circuit design;
determine that a plurality of the elements are located in the critical path; and
selectively compensate polyconductor (PC) perimeter densities of one or more of the plurality of the elements in the critical path of the integrated circuit based on respective PC perimeter densities of the plurality of the elements,
wherein:
the critical path is one of a plurality of signal paths in the semiconductor chip design; and
the critical path has the greatest delay among the plurality of signal paths.

15. The computer program product of claim 14, further comprising:
updating a timing analysis of the integrated circuit design; and
discarding at least one of the compensated PC perimeter densities when the updated timing analysis indicates the critical path violates a timing constraint of the integrated circuit design.

16. The computer program product of claim 14, wherein the compensating the PC perimeter densities comprises:
performing a first compensation technique and a second compensation technique at a region of the critical path when a respective one of the PC perimeter densities associated with one of the plurality of the elements is greater than a threshold; and
performing only the second compensation technique when the respective one of the PC perimeter densities associated with the one of the plurality of elements is less than or equal to the threshold.

17. The computer program product of claim 14, wherein the first compensation technique is fill compensation and the second compensation technique is channel length compensation.

18. The computer program product of claim 17 wherein:
the performing a first compensation technique comprising channel length compensation includes modifying channel lengths of FETs in one or more of the plurality of the elements determined to be in the critical path; and the performing a second compensation technique comprising fill compensation includes adding dummy cells to inactive spaces in regions in the semiconductor chip design around the one or more of the plurality of the elements determined to be in the critical path.

19. The computer program of claim 14, further comprising associating the PC perimeter densities with the plurality of the elements by, for each of the plurality of the elements, assigning a PC perimeter density determined for a region of the semiconductor chip design that includes the plurality of the elements.

20. The computer program of claim 19, wherein each of the PC perimeter densities correspond to one of a plurality of predetermined PC perimeter density ranges.

21. The computer program product of claim 20, wherein each of the PC perimeter density ranges are associated with predetermined density compensation values.

22. The computer program product of claim 21, wherein the predetermined density compensation values include a transistor channel length compensation value and a fill compensation value.

\* \* \* \* \*